United States Patent [19]

Hasegawa

[11] 4,085,429
[45] Apr. 18, 1978

[54] MAGNETIC HEAD HAVING OPTIMUM SPACER THICKNESS DISPOSED BETWEEN DUMMY AND WRITE-IN CORE SEGMENTS

[75] Inventor: Tachio Hasegawa, Chichibu, Japan

[73] Assignees: Canon Kabushiki Kaisha, Tokyo; Canon Denshi Kabushiki Kaisha, Saitama, both of Japan

[21] Appl. No.: 692,332

[22] Filed: Jun. 3, 1976

[30] Foreign Application Priority Data

Jun. 13, 1975  Japan ................................. 50-71677

[51] Int. Cl.$^2$ .......................... G11B 5/25; G11B 5/22; G11B 5/27
[52] U.S. Cl. .................................... 360/119; 360/121; 360/125
[58] Field of Search ................ 360/119, 122, 120–121, 360/118, 125

[56] References Cited

U.S. PATENT DOCUMENTS

| | | | |
|---|---|---|---|
| 3,167,618 | 1/1965 | Oster et al. | 360/119 |
| 3,353,168 | 11/1967 | Poumakis | 360/121 |
| 3,562,443 | 2/1971 | Bos et al. | 360/119 |
| 3,662,122 | 5/1972 | Grundtner et al. | 360/121 |
| 3,668,332 | 6/1972 | Anderson | 360/121 |
| 3,827,083 | 7/1974 | Hosaka et al. | 360/118 |

Primary Examiner—Alfred H. Eddleman
Attorney, Agent, or Firm—Fitzpatrick, Cella, Harper & Scinto

[57] ABSTRACT

In a magnetic head comprising a write-in excitation core and a read-out excitation core having a narrower track width than that of the write-in excitation core and forming a closed magnetic circuit with a gap interposed between the two cores, a non-magnetic spacer having thickness 1.5 to 5 times as great as the width of the gap is disposed at one or each end of the read-out excitation core with respect to the widthwise direction of the track thereof, and a dummy core is disposed adjacent to the read-out excitation core with the non-magnetic spacer interposed therebetween to form a closed magnetic circuit with the gap interposed between the dummy core and the write-in excitation core.

3 Claims, 17 Drawing Figures

FIG. 1
PRIOR ART
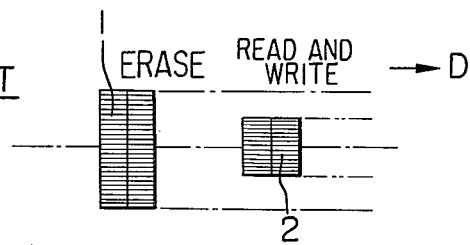
FIG. 2
PRIOR ART
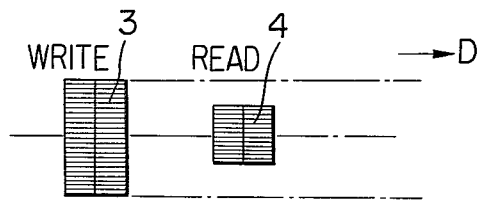
FIG. 3
PRIOR ART
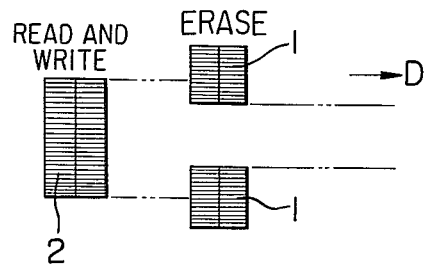
PRIOR ART FIG. 4
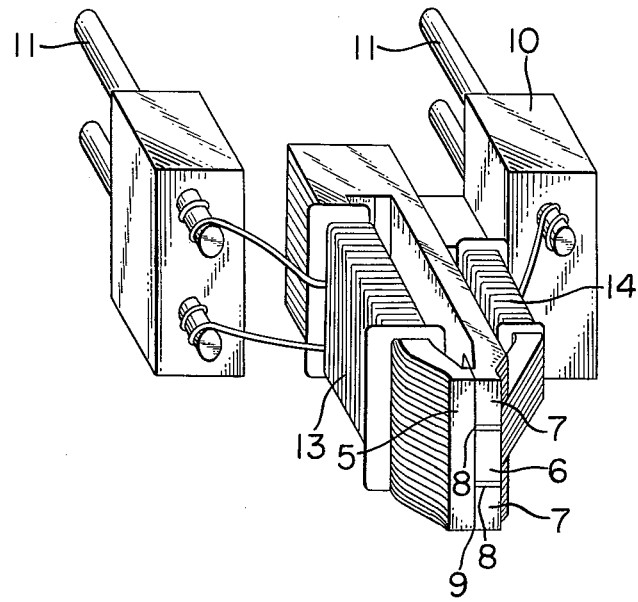

MAGNETIC HEAD HAVING OPTIMUM SPACER THICKNESS DISPOSED BETWEEN DUMMY AND WRITE-IN CORE SEGMENTS

BACKGROUND OF THE INVENTION

1. Field of the Invention

This invention relates to a magnetic head for digital recording, and more particularly to a magnetic head in which the influence of the leakage flux during operation is minimized.

2. Description of the Prior Art

In digital recording on a magnetic tape, magnetic disc, magnetic drum, magnetic card reader or the like, the S/N ratio has heretofore been a critical factor which affects the reliability of the recording.

Particularly, in these devices which must have interchangeability of devices and replaceability of data, minimization of the influence of unerased old data or the influence of the data on an adjacent track (crosstalk) has been a fundamental and important problem for improving the S/N ratio and further the reliability.

To overcome such a problem, various systems have heretofore been employed as shown in FIGS. 1, 2 and 3 of the accompanying drawings. The method shown in FIG. 1 is one which utilizes a combination of an erase head and a read-and-write head and in which the read-and-write head 2 is disposed downstream of the erase head 1 with respect to the direction of tape movement, D. FIG. 2 shows a method which utilizes a combination of a write-in head and a read-out head and in which the read-out head 4 is disposed downstream of the write-in head 3 with respect to the direction of tape movement, D. FIG. 3 shows a method which employs a combination of a read-and-write head and a tunnel erase head and in which two erase heads 1 are disposed downstream of the read-and-write head 2 with respect to the direction of tape movement D so as to erase the opposite widthwise edge portions of the tape which have been recorded by the head 2.

These systems are highly effective to enhance the S/N ratio, but the presence of theoretically plural gaps has required division or combination of heads which in turn has left numerous points still to be improved for practical use, such as the complexity of construction, the difficulty with which the heads make intimate contact with the recording medium, the higher cost of the head unit, etc.

In an effort to eliminate such disadvantages and moreover, to attain a simplified construction and higher reliability, there has been proposed a magnetic head improved as shown in FIGS. 4 and 5. FIG. 4 is a perspective view showing the internal structure of such improved magnetic head and FIG. 5 is a pictorial perspective view thereof. In FIGS. 4 and 5, there is seen a write-in excitation core 5, a write-in excitation winding 13 coiled around the excitation core 5, a read-out core 6 having a narrower track width than that of the write-in excitation core 5 and disposed in opposed relationship with the core 5 to form a closed magnetic circuit with a gap 9 interposed between the cores 5 and 6, a read-out excitation winding 14 coiled around the read-out core 6, dummy cores 7 disposed adjacent to the read-out core 6 with a non-magnetic spacer 8 interposed between the read-out core 6 and the dummy cores 7 with respect to the widthwise direction of the read-out core track, so as to form a closed magnetic circuit with the write-in excitation core 5 and a gap 9 interposed between the dummy cores, a holder member 10 for holding said cores, external terminals 11 provided on the holder member 10, and an outer casing 12. All these members together constitute a magnetic head generally designated by 15.

The basic operation of the magnetic head will now be described by reference to FIGS. 6 and 7 which illustrate the operations of the magnetic head of FIGS. 4 and 5 during write-in and read-out, respectively. In FIG. 6, it will be seen that information may be recorded on a tape 16 over the entire width of the core 5 by a signal current flowing to the excitation coil 13. More specifically, the magnetic flux produced by the write-in excitation core 5 skips over the gap 9 to flow into the read-out core 6 and the dummy cores 7, but since all these cores with the write-in excitation core 5 constitute the closed magnetic circuit, magnetic recording is effected uniformly with respect to the widthwise direction of the track as indicated by slant lines (although, when the spacers are inserted, the portions of the tape occupied by them are difficult to magnetize, the effect of which will later be described).

Referring to FIG. 7 which illustrates the read-out operation, it will be seen that only if the read-out core 6 lies within the range of the write-in core 5, output is stable wherever the read-out core is situated. In other words, most of the magnetic flux resulting from the signal magnetization on the dummy cores 7 is short-circuited by the excitation (write-in) core 5 and dummy cores 7 while only very small part of the flux comes to leak to the core 6. Therefore, if such a small quantity of leakage is negligible, the shown magnetic head will be identical in operational principle to the system of FIG. 2 which employs a combination of a write-in head and a read-out head. Thus, in spite of being of a single gap construction, the present magnetic head 15 is one which may perform a wide write-in operation as indicated by the rightwardly downwardly inclined lines and a narrow read-out operation as indicated by leftwardly downwardly inclined lines.

As can be judged from the above-described basic operation, it is necessary in putting such magnetic head into practical use that the following two conflicting conditions be solved: that during write-in, uniform magnetization can be accomplished throughout the great width of the write-in core 5; and that during read-out, the magnetization on the dummy cores 7 should not leak to the read-out core 6. In other words, during write-in, the absence of the spacers 8 disposed between the read-out core 6 and the dummy cores 7 is desirable while, during read-out, the presence of such spacers is necessary to reduce the leakage. Therefore, when the magnetic head 15 is to be put into practice, determining the dimensions and configuration of the spacers 8 is an important problem and this is why such head has not been put into practice as yet.

SUMMARY OF THE INVENTION

The present invention has overcome such a problem and succeeded in determining an optimum configuration for the spacers through various experments.

According to the present invention, there is provided a magnetic head which comprises a write-in excitation core having a write-on winding coiled thereon, a read-out excitation core having a narrower track width than that of the write-in excitation core and forming a closed magnetic circuit with a gap interposed between the read-out excitation core and the write-in excitation core, the read-out excitation core having a read-out winding coiled thereon, a non-magnetic spacer having a thickness 1.5 to 5 times as great as the width of the gap and disposed at one or each end of the read-out excitation core with respect to the widthwise direction of the track of the read-out excitation core, and a dummy core disposed adjacent to the read-out excitation core with the non-magnetic spacer interposed therebetween and forming a closed magnetic circuit with the gap interposed between the dummy core and the write-in excitation core.

The invention will become more fully apparent from the following detailed description thereof taken in conjunction with the accompanying drawings.

BRIEF DESCRIPTION OF THE DRAWINGS

FIGS. 1, 2 and 3 show various systems of the magnetic head according to the prior art.

FIG. 4 is a perspective view showing the internal structure of an improved magnetic head according to the prior art.

DESCRIPTION OF THE PREFERRED EMBODIMENTS

The process through which the optimum configuration of the spacer may be determined will first be described.

The point to which attention should be paid in determining the dimensions and configuration of the spacer is to improve the S/N ratio for the overall characteristic (of write-in and read-out) of the head. However, the relation between the dimensions of the spacer and the S/N ratio is not unidimensional but requires various conditions to be taken into account. Originally, the insertion of the spacers is directed to the purpose of reducing the noise component extending from the recording magnetization on dummy cores to the read core during read-out, and the S/N ratio must be discussed with the following two conditions also taken into account:

1. Differences in physical properties and thickness of the recording medium (the difference in physical properties includes the difference in magnetic characteristic resulting from difference in magnetic material); and 2. Relations between the positional deviation in the widthwise direction of the track during relative movement of the recording medium and the head (the irregularity of the moving system) and the mechanical dimensions of the head components (write-in excitation core, read-out core and dummy cores).

Condition (1) above is concerned with controlling the unerased portion on the spacer during write-in and has nothing to do with the read-out system but affects the write-in operation only.

Condition (2) above is concerned with the write-in and the read-out characteristic and particularly, during the write-in operation, it is concerned with the unerased portion on the track end sections and during the read-out operation, it is concerned with the quantity of the noise component flux flowing from the unerased portion to the read-out coil.

With the foregoing two conditions taken into account, the function of the spacer during read-out and write-in and the practical limit of the spacer dimensions will be clarified hereinafter.

Condition (2) will first be considered. Generally, as far as the tape movement on the magnetic head is concerned, it is often the case that irregularity of tape movement, non-uniformity of tape dimensions and configuration and some other reason may cause positional deviation between the moving tape and the corresponding track width of the head. Incidentally, the S/N ratio resulting from such deviation of the track width is varied by the positional relation between the tape and the head and the countermeasure for such S/N ratio should appropriately be discussed for the worst case where the deviation of the track width is greatest.

Figure 5:
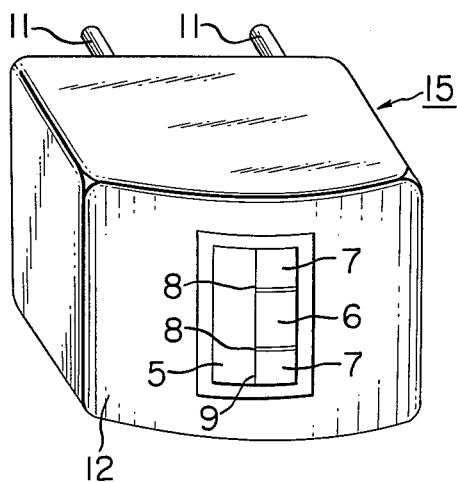
FIG. 5 is a pictorial perspective view of the FIG. 4 head.
Figure 6:
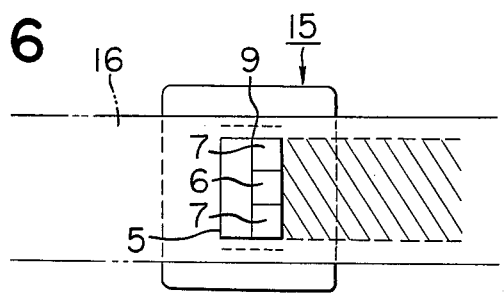
FIGS. 6 and 7 illustrate the operations of the magnetic head of FIGS. 4 and 5 during write-in and read-out, respectively.
Figure 7:
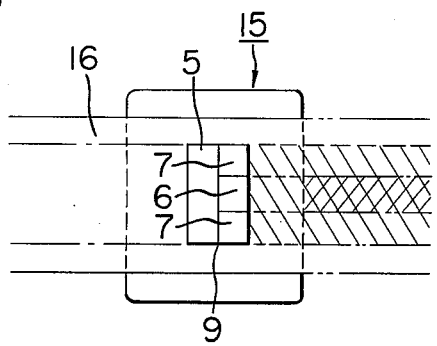

In the magnetic head 15 shown in FIG. 5, let the track width of the write-in excitation core 5 be W and the track width of the dummy cores 7 be 2$d$. Under normal conditions of use, it will be sufficient to regard as the worst condition a case where there has occured a track width deviation corresponding to the track width 2$d$ of the dummy cores 7. Thus, in the following discussion, the S/N ratio will be analysed on the assumption of such a case where a track width deviation of 2$d$ has taken place.

Figure 8:
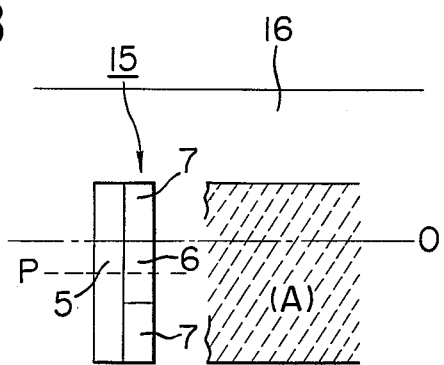
FIG. 8 and FIGS. 9(I) and (II) illustrate the relations between the position of the magnetic head of FIGS. 4 and 5 in the widthwise direction of the track and the write-in width on the tape.
Figure 9:
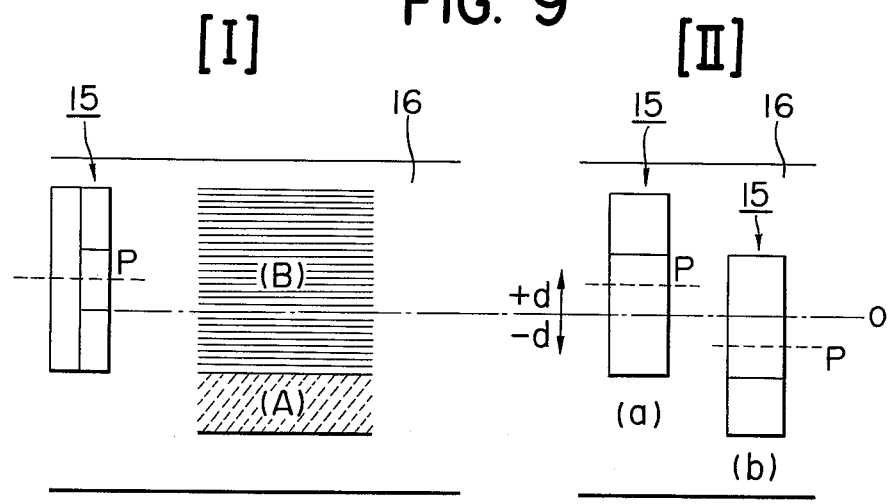
Figure 10:
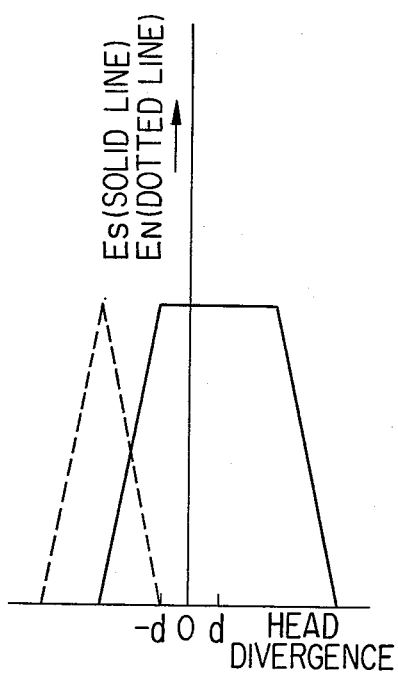
FIG. 10 is a graph illustrating the ideal relations between the moving distance and the signal output and the noise output of the same magnetic head.

FIG. 8 and FIGS. 9(I) and (II) illustrate the relations between the track width position of the magnetic head and the write-in width on the tape. Assume that, as shown in FIG. 8, the magnetic head 15 is disposed so that the center line P of the track width is located at a position of -$d$ with respect to the axis O indicated by dot-and-dash line. Then, recording as indicated by slant lines (A) will occur on the tape as it moves over the head 15. If further information is to be written in such recorded tape and if the relative position of the magnetic head to the tape is such as shown in FIG. 9(I) wherein the center line P of the head is deviated by 2$d$ from its position in FIG. 8, then the new write-in will occur on the write-in pattern (A) previously recorded in FIG. 8, with a result that a second write-in pattern (B) is formed with a part of the previously written pattern (A) remaining as an unerased pattern. Under such presupposition, assume that signals are to be read-out from the tape and consider the S/N ratio when the center line P of the magnetic head 15 during read-out has come to the positions ($a$) and ($b$) in FIG. 9(II). Herein, S and N are regarded as independent signal systems and the overall S/N ratio will be calculated by knowing their respective read-out outputs. An example of the output $E_S$ (solid line) and $E_N$ (dotted line) when S and N are individually read-out is shown in FIG. 10, wherein the abscissa represents the moving distance of the magnetic head center line P with respect to the axis O. In the graph of FIG. 10, it should be understood that during read-out, the flux resulting from the recording magnetization of the tape does not spread laterally (widthwise of the track) but all the flux flows in the depth direction to form a closed magnetic circuit. At such time, as is apparent from FIG. 10, the S/N ratio becomes infinite within the positional deviation range $\pm d$ of the head, so that the unerased portion affects S/N in no way.

Figure 11:
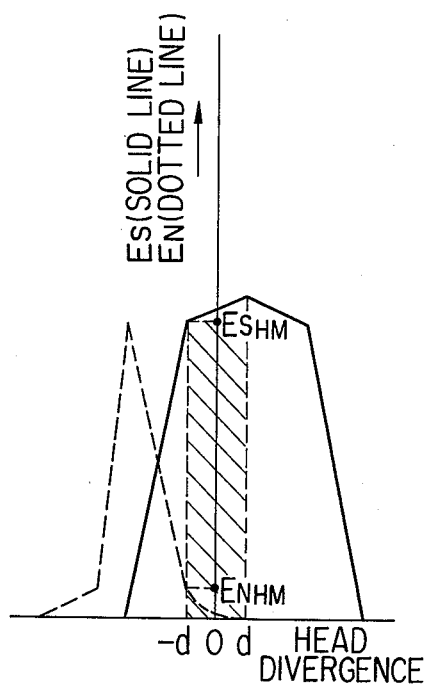
FIG. 11 is a graph illustrating the actual relations between said factors.
Figure 12:
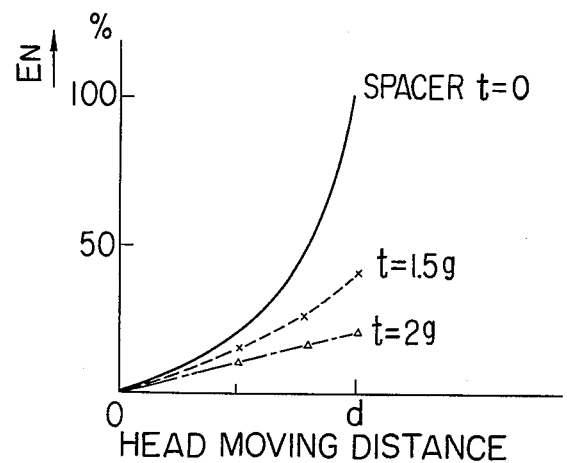
FIG. 12 is a graph showing the relation between the head moving distance and the noise output with the spacer thickness $t$ as the parameter.

Actually, however, the magnetic flux resulting from the recording magnetization not only flows in the depth direction but also spreads laterally (widthwise of the track) and therefore, the graph of FIG. 10 is modified as shown in FIG. 11. In FIG. 11, the position whereat the worst S/N ratio occurs is the position whereat the magnetic head 15 occupies the position (b) in FIG. 9(II) within the range of $\pm d$, and S/N in this case is determined thus:

$$S/N = E_{SMIN}/E_{NMAX}$$

where $E_{SMIN}$ is the value of $E_S$ at $-d$ and $E_{NMAX}$ is the value of $E_N$ at $-d$. $E_{SMIN}$ is constant while $E_{NMAX}$ is dependent on the head construction, and particularly on the spacer thickness. Tests carried out regarding the relation between the magnitude of the $E_{NMAX}$ and the FIG. 12. From this, it has been found that the greater the spacer thickness $t$, the smaller the value of $E_{NMAX}$ and in practice, a spacer thickness at least 1.5 times as great as the gap width $g$ is sufficient.

It has thus been found that increased spacer thickness is advantageous to improve the S/N ratio during read-out operation while, on the other hand, too great a spacer thickness is undersirable for write-in operation.

In this connection, description will now be made of the relation between said condition (1) and the spacer thickness.

An important point in the write-in operation is that uniform magnetization should occur over the entire width of the write-in excitation core and in the case of the above-described magnetic head wherein non-magnetic spacers are present in the widthwise direction of the track, the unrecorded (unmagnetizable) portions of the tape corresponding to those spacers will offer problems.

Now, it is apparent that the track-widthwise spread of the leakage flux from the gap portion during write-in operation effects the recording on the portions of the tape corresponding to the non-magnetic spacers, but in the saturation recording adopted for the digital recording, the intensity of the write-in field imparted is such that the magnetic particles of the tape are sufficiently saturated and in actual applications, a current 1.5 to 2.5 times as great as the write-in current $I_S$ necessary to saturate the magnetic particles of the tape is applied to the write-in excitation winding.

When such an intense field is applied, recording occurs in the gap-corresponding portion of the tape beyond the effective track width. Perceiving the fact that such an increased recording width serves to eliminate the unrecorded portions of the tape corresponding to the spacers the inventors have carried out experiments to determine the spacer thickness.

Figure 13:
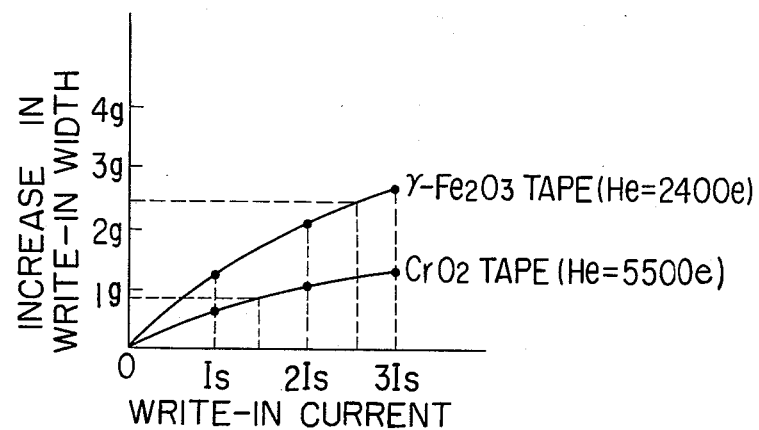
FIG. 13 graphically illustrates an example of the relation between the increase in the write-in current and the increase in the write-in width when the tape material is varied.

FIG. 13 is a graph illustrating the relation between the increase in the write-in current and the increase in the write-in width for $\gamma$-$Fe_2O_3$ tape and $CrO_2$ tape. As will be seen in this graph, the expansion of the write-in width (the gap width is $g$) depends greatly on the coercive force He (unit Oe) of the tape material which is a parameter, so that the greater the He, the smaller the expansion of the write-in width, thus indicating the lower limit of the spacer thickness $t$. On the contrary, wider spacers may be inserted for tape material of smaller He. Empirically, it has been found for the commercially popular tape (He=200-600 Oe) that the problem of unrecorded portions resulting from the presence of spacers can be overcome by suitably choosing spacers having a width 0.7 to 5 times as great as the gap width, but a conclusion has been arrived at that the spacer width should be 1.5 to 5 times as great as the gap width, in accordance with the condition that the spacer width $t$ be greater than 1.5g in view of the aforementioned S/N relation in the read-out characteristic.

Incidentally, in FIG. 13, the increase in write-in width for write-in current of 1.5 $I_S$ to 2.5 $I_S$ is in the range from 1.8g to 2.5g for $\gamma$-$Fe_2O_3$ tape, and in the range of 0.8g to 1.3g for $CrO_2$ tape.

The present invention consists in applying the above-described spacer width conditions to the magnetic head as shown in FIG. 5, whereby uniform write-in may take place over the entire track width during write-in operation and the influence of the leakage flux from the unerased pattern as indicated at (A) in FIG. 9(I) may be reduced during read-out operation.

Figure 14:
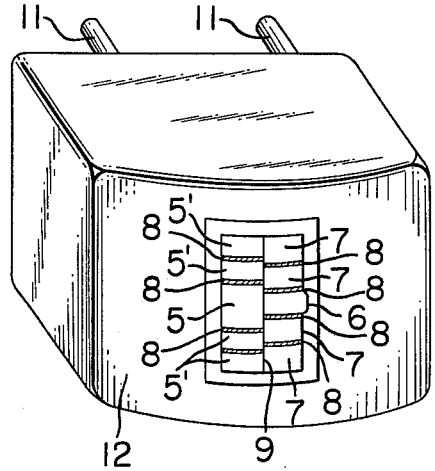
FIGS. 14, 15 and 16 are schematic perspective views showing various embodiments of the magnetic head according to the present invention.

FIG. 14 shows an embodiment of the magnetic head according to the present invention in which a plurality of write-in cores 5' with spacers 8 interposed between adjacent ones of such cores 5' are disposed on the opposite sides of the write-in core 5 with respect to the widthwise direction of the track and a plurality of dummy cores 7 with spacers 8 interposed between adjacent ones of such dummy cores 7 are disposed on the read-out core 6 side also with respect to the widthwise direction of the track. In this embodiment, the thickness of each spacer 8 is 1.5 to 5 times as great as the width of the gap 9, as already described. According to this system, uniform magnetization may occur over the entire width of the track during write-in operation, in spite of the presence of the spacers, and the noise component resulting from the unerased pattern may particularly be reduced during read-out operation.

Figure 15:
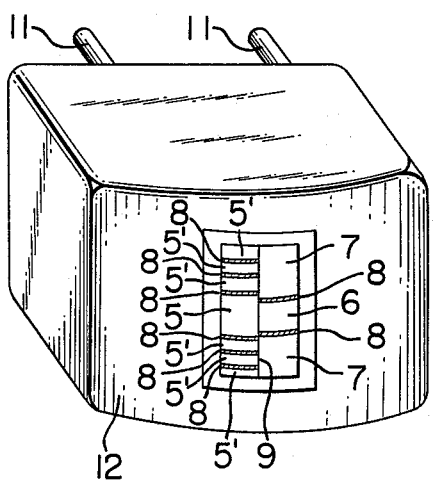
Figure 16:
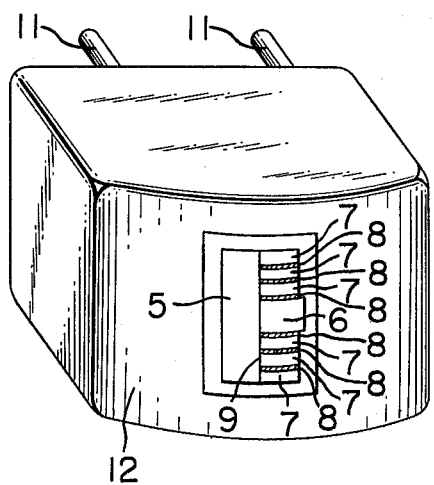

It will be apparent that the object of the present invention may also be achieved by dividing either the write-in core or the dummy cores in FIG. 14 to construct the head as shown in FIG. 15 or FIG. 16.

What is claimed is:

1. A magnetic head comprising:
a write-in excitation core;
a write-in coil wound around said write-in excitation core;
a read-out excitation core having narrower track width than that of said write-in excitation core for forming a closed magnetic loop circuit with a gap interposed between said read-out excitation core and said write-in excitation core;
a read-out coil wound around said read-out excitation core;
a non-magnetic spacer having thickness 1.5 to 5 times as great as the width of said gap and disposed at at least one end of said read-out excitation core with respect to the width direction of the track of said read-out excitation core; and a dummy core disposed adjacent to said read-out excitation core with said non-magnetic spacer interposed therebetween for forming a closed magnetic loop circuit with a dummy gap interposed between said dummy core and said write-in excitation core, the dummy gap having the same width as said first mentioned gap, said dummy core comprising a plurality of divided dummy core segments, and additional non-magnetic spacers each of which has thickness 1.5 to 5 times as great as the width of said first mentioned gap and interposed among respective ones of said dummy core segments.

2. A magnetic head comprising:

a read-out excitation core;

a read-out coil wound around said read-out excitation core;

a write-in excitation core having wider track width than that of said read-out excitation core for forming a closed magnetic loop circuit with a gap interposed between said read-out excitation core and said write-in excitation core, said write-in excitation core comprises a plurality of divided write-in excitation core segments, and non-magnetic spacers each of which has thickness 1.5 to 5 times as great as the width of said gap and interposed among respective ones of said write-in excitation core segments;

a write-in coil wound around said write-in excitation core;

an additional non-magnetic spacer having thickness 1.5 to 5 times as great as the width of said gap and disposed at at least one end of said read-out excitation core with respect to the width direction of the track of said read-out excitation core; and a dummy core disposed adjacent to said read-out excitation core with said additional non-magnetic spacer interposed therebetween for forming a closed magnetic loop circuit with the gap interposed between said dummy core and said write-in excitation core.

3. A magnetic head according to claim 2, wherein said dummy core comprises a plurality of divided dummy core segments, and further additional non-magnetic spacers each of which has thickness 1.5 to 5 times as great as the width of said gap and interposed among respective ones of said dummy core segments.

* * * * *

UNITED STATES PATENT AND TRADEMARK OFFICE
CERTIFICATE OF CORRECTION

PATENT NO. : 4,085,429
DATED : April 18, 1978
INVENTOR(S) : TACHIO HASEGAWA

It is certified that error appears in the above—identified patent and that said Letters Patent are hereby corrected as shown below:

Column 5, line 28, after "the $E_{NMAX}$ and the" insert --spacer thickness have obtained the result as shown in--.

Signed and Sealed this

Twenty-ninth Day of May 1979

[SEAL]

Attest:

RUTH C. MASON
*Attesting Officer*

DONALD W. BANNER
*Commissioner of Patents and Trademarks*